United States Patent
Rang et al.

(10) Patent No.: US 8,364,134 B2
(45) Date of Patent: Jan. 29, 2013

(54) AUTOMATIC LANGUAGE SELECTION FOR TEXT INPUT IN MESSAGING CONTEXT

(75) Inventors: Maria Rang, Landskrona (SE); Marcel Wong, Barsebäck (SE)

(73) Assignee: Sony Ericsson Mobile Communications AB, Lund (SE)

( * ) Notice: Subject to any disclaimer, the term of this patent is extended or adjusted under 35 U.S.C. 154(b) by 929 days.

(21) Appl. No.: 11/915,624

(22) PCT Filed: May 26, 2006

(86) PCT No.: PCT/EP2006/005025
§ 371 (c)(1),
(2), (4) Date: May 22, 2008

(87) PCT Pub. No.: WO2006/125660
PCT Pub. Date: Nov. 30, 2006

(65) Prior Publication Data
US 2009/0170536 A1    Jul. 2, 2009

Related U.S. Application Data (60) Provisional application No. 60/686,376, filed on Jun. 1, 2005.

(30) Foreign Application Priority Data

May 27, 2005   (EP) .................................. 05011530

(51) Int. Cl.
H04M 3/00           (2006.01)
(52) U.S. Cl. ........................ 455/418; 455/466
(58) Field of Classification Search .................. 455/466, 455/418
See application file for complete search history.

(56) References Cited

U.S. PATENT DOCUMENTS

| | | | |
|---|---|---|---|
| 5,805,911 A | 9/1998 | Miller et al. | |
| 7,623,860 B2 * | 11/2009 | Hurst | 455/432.1 |
| 7,962,169 B2 | 6/2011 | Fux et al. | |
| 8,010,338 B2 | 8/2011 | Thorn | |
| 2001/0056348 A1 * | 12/2001 | Hyde-Thomson et al. | 704/260 |

(Continued)

FOREIGN PATENT DOCUMENTS

| CN | 1369830 | 9/2002 |
|---|---|---|
| CN | 1586066 | 2/2005 |

(Continued)

OTHER PUBLICATIONS

"Microsoft Word 200 Product Enhancements Guide" [online] Oct. 1998.

(Continued)

*Primary Examiner* — Steven Lim
(74) *Attorney, Agent, or Firm* — Renner, Otto, Boisselle & Sklar, LLP (57) ABSTRACT

A method of controlling a keypad input mode for a text message entered on an electronic equipment for wireless communication (1) is provided that comprises steps for determining a language setting for the text message (S1) and for setting the keypad input mode to a dictionary-based disambiguation mode related to the determined language setting (S2). The language setting used at the beginning of the text message is hereby determined as the language setting used for the last text message entered on the electronic equipment for wireless communication (1) or as the language determined for a received text message to be replied by the text message, and the language setting used is subject to be changed if a match for a predetermined number of text elements entered for the text message is present in a further dictionary-based disambiguation mode related to a different language setting.

23 Claims, 2 Drawing Sheets

U.S. PATENT DOCUMENTS

| | | |
|---|---|---|
| 2003/0125927 A1 | 7/2003 | Seme |
| 2005/0108017 A1* | 5/2005 | Esser et al. .................... 704/277 |
| 2006/0119583 A1 | 6/2006 | Potera |
| 2007/0168450 A1 | 7/2007 | Prajapat et al. |
| 2007/0265828 A1 | 11/2007 | Scott et al. |
| 2008/0070604 A1 | 3/2008 | Castagnet |
| 2009/0058823 A1 | 3/2009 | Kocienda |
| 2009/0077464 A1 | 3/2009 | Goldsmith et al. |
| 2010/0159891 A1 | 6/2010 | Sigmund et al. |

FOREIGN PATENT DOCUMENTS

| | | |
|---|---|---|
| DE | 10-2004-059686 A1 | 6/2006 |
| EP | 1 255 184 A1 | 11/2002 |
| EP | 1 480 420 A | 11/2004 |
| EP | 1 480 421 A1 | 11/2004 |
| EP | 1 901 534 A1 | 3/2008 |
| WO | WO 00/57265 A | 9/2000 |
| WO | 2006/0125660 A2 | 11/2006 |
| WO | 2008/125660 A2 | 11/2006 |
| WO | 2008/065546 A1 | 6/2008 |

OTHER PUBLICATIONS

International Search Report for PCT/EP2006/005025, dated Nov. 3, 2006.

Written Opinion of the International Searching Authority, or the Declaration, dated Nov. 3, 2006.

International Preliminary Report on Patentability, dated Aug. 8, 2007.

Office Action for copending U.S. Appl. No. 12/616,386 mailed Dec. 14, 2011.

International Search Report for copending International Application No. PCT/EP2010/064555 mailed Feb. 3, 2011.

Written Opinion for copending International Application No. PCT/EP2010/064555 mailed Feb. 3, 2011.

Office Action, mailed Jun. 8, 2012, for U.S. Appl. No. 12/616,386, filed Nov. 11, 2009.

* cited by examiner

AUTOMATIC LANGUAGE SELECTION FOR TEXT INPUT IN MESSAGING CONTEXT

This application is a §371 of International Application No. PCT/EP2006/005025filed on May 26, 2006, which claims benefit to U.S. Provisional Application No. 60/686,376 filed on Jun. 1, 2005, and also claims priority to European Application No. 05011530.2 filed on May 27, 2005.

TECHNICAL FIELD OF THE INVENTION

The present invention relates to a control of the keypad input mode for characters on mobile terminals, particularly to a keypad input mode control enabling an adaptation of the keypad input mode to the language currently used in a message.

DESCRIPTION OF RELATED ART

Figure 1:
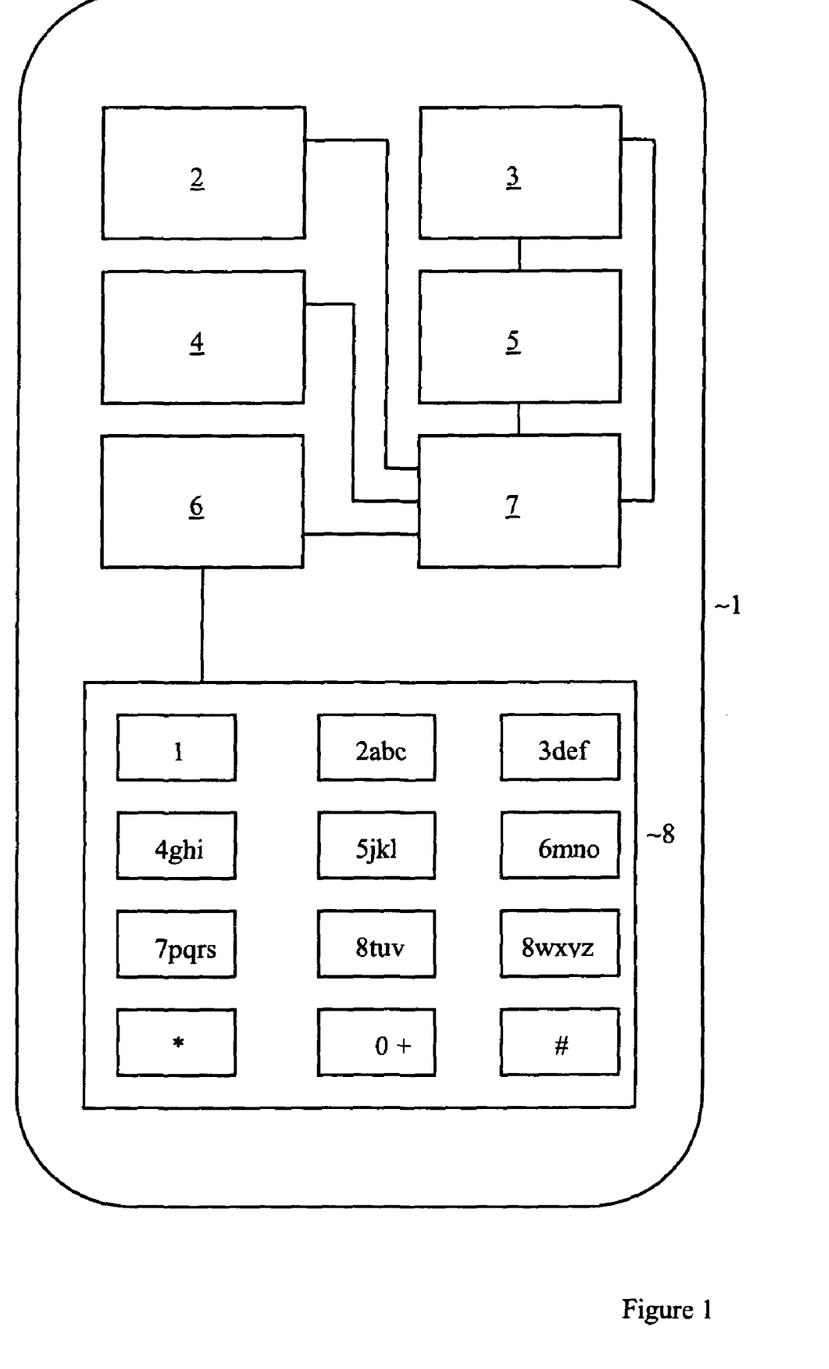
FIG. 1 is a schematic representation of an electronic equipment for wireless communication according to the present invention.

On most of the currently available electronic equipment for wireless communication like e.g. portable radio communication equipment such as mobile telephones, pagers, or communicators like for instance electronic organisers, smartphones, PDAs (Personal Digital Assistant) or other wireless communication appliances alike, text input is only possible with the standard telephone keypad. The telephone keypad consists of number keys and additional symbol keys. A variety of theses keys additionally have an alphabetic or special character assigned to it for enabling an entry of text on the equipment. The alphabetic characters 'a' to 'z' and some special characters are usually distributed over a subset of the keys. As a western style alphabet typically comprises at least 26 characters or more, up to three or four characters are usually grouped on one key. The multiple assignment of numbers and characters results in an ambiguity that complicates the creation of text messages on the wireless communication equipment. An example for a respective keypad with multiple key assignment is shown in FIG. 1.

Currently, two different key input modes are usually employed on mobile terminals to overcome the ambiguity associated with multiple key assignment.

The first, which is usually referred to as Multitap or multitap-mode is a general purpose text input method where a user presses each key one or more times to specify the desired character. A key being assigned the characters 'm', 'n', and 'o' will have for instance to be pressed once to obtain the character 'm', twice in short sequence for obtaining the character 'n', and thrice in short sequence to enter the character 'o'. Operational problems arise for a double-entry of one and the same character or when two characters to be inputted consecutively are provided on the same key. A user will then usually have to wait for a certain period of time after each character entry before the system is ready to accept a further character or number entry. Due to this time consuming and inefficient process slowing down the creation of a text message, the multitap-mode is generally not well liked by users of an electronic equipment for wireless communication, even though the key input sequence is accurately defined for each character or number.

Another way to overcome the ambiguity associated with multiple key assignment is to add a dictionary to the system and compare each key input sequence with the content of the dictionary for guessing the text entered. A respective key input mode technique is known as a dictionary-based disambiguation mode. Commercial examples for this type of text input mode are for instance the T9, eZiText, and iTAP text input modes. As, when using dictionary-based disambiguation each key is pressed only once for entering a character or number, text can be entered very fast, thus allowing an effective creation of a text message on electronic equipment for wireless communication with a telephone keypad.

The guess of the intended text input is typically based on the probability by which a certain key input sequence corresponds to a certain text element like a word. This probability is language dependent. Assumed that the characters 'a', 'b', and 'c' are assigned to key '2', the characters 't', 'u', and 'v' to key '8', and the characters 'd', 'e', and 'f' to key '3', then a key input sequence of the form key '2'-key '8'-key '3' will result in the text element 'auf' (the German equivalent to the English 'on') when using a dictionary-based disambiguation mode related to the German language and in the text element 'bud' when using a dictionary-based disambiguation mode related to the English language. As can be seen by this example, the interpretation of the key input sequence depends strongly on the language related to the dictionary-based disambiguation mode used. The term of a language being related to a dictionary-based disambiguation mode means that the dictionary used for the disambiguation mode is of the respective language. Typically a dictionary-based disambiguation mode comprises not only the dictionary itself but at least also the probabilities, by which each text element or word of the dictionary can be assigned to a certain key input sequence.

Many users of electronic equipment for wireless communication, particularly those of multilingual nations, communicate with different persons in different languages. To successfully use the dictionary-based disambiguation technique for text input in various languages, a special dictionary-based disambiguation mode has to be available for each language used. When writing a text message like for instance an SMS (text message with Short Message Service) or an MMS (text message with Multimedia Messaging Service) to another party, a user typically writes this message in a language which he prefers for a communication with this party. If this language is different from a default language, the user is currently required to manually select the appropriate dictionary-based disambiguation mode related to the new language prior to writing the message. This requires some time for browsing through the menu structure. And often, particularly under stress situations, a user forgets to change to the correct dictionary-based disambiguation mode in time, so that the key input sequences are frequently misinterpreted resulting in text making no sense.

It is therefore an object of the present invention to provide a control of the keypad input mode on an electronic equipment for wireless communication with respect to a language that is likely to be used when entering text for a text message.

SUMMARY

This object is achieved by the invention as defined in the independent claims. Further developments of the invention are the subject of dependent claims.

The present invention comprises a method of controlling a keypad input mode for a text message entered on an electronic equipment for wireless communication comprising steps for determining a language setting for the text message and for setting the keypad input mode to a dictionary-based disambiguation mode relating to the determined language setting. The language setting used at the beginning of the text message is hereby determined corresponding to the language setting used for the last text message entered on the electronic equipment for wireless communication or corresponding to the language determined for a received text message to be replied by the text message, and the language setting is subject to be changed if matches for a predetermined number of text elements entered for the text message are present in a further dictionary-based disambiguation mode relating to a different language setting.

It should be emphasised that the term "comprises/comprising" when used in this specification is taken to specify the presence of stated figures, integers, steps or components but does not preclude the presence or addition of one or more other features, integers, steps, components or groups thereof.

The present invention further comprises an electronic equipment for wireless communication with a language-sensitive keypad input mode control for a text message entry with a keypad having at least one key to which more than one character is assigned for alphabetic input, a language setting determination means for determining a language setting, and a keypad control means adapted for controlling the keypad input mode in correspondence to a dictionary-based disambiguation mode relating to a language setting determined by the language setting determination means. The language setting determination means is hereby adapted to determine the language setting used at the beginning of the text message corresponding to the language setting used for the last text message entered on the electronic equipment for wireless communication or corresponding to the language determined for a received text message to be replied by the text message, and the language setting determination means is also adapted to change the language setting if matches for a predetermined number of text elements entered for the text message are present in a further dictionary-based disambiguation mode relating to a different language setting.

The present invention still further provides a computer software product for controlling a keypad input mode for a text message entered on an electronic equipment for wireless communication according to the present invention, whereby the computer software product is adapted, when loaded into a memory and processed by a data processing means of an electronic equipment for wireless communication to perform thereon a method according to the present invention.

The present invention implements an adaptation of the keypad input mode to a language used for a text entry of a text message in a very effective way. It makes use of the fact, that the language used for drafting a text message is more likely that of the previously entered text message or, if a received text message is to be replied with the current text message, that of the received text message, and not a default language. A further improvement is achieved by monitoring the language setting at least after the first language setting determination.

The language setting used for the text message entered last on the electronic equipment for wireless communication is advantageously provided in a data file enabling a language setting determination with a minimum effort.

For determining the language prevailing in a received text message to be replied, the language of that message is advantageously determined by examining the text elements of the received text message with each of the dictionary-based disambiguation modes available on the electronic equipment for wireless communication and by defining the language of the received text message as the language of the dictionary-based disambiguation mode yielding the highest percentage of matches with a predetermined number of text elements at the beginning of the received text message or with all text elements of the message.

In a preferred embodiment of the present invention the text elements of said predetermined number of entered text elements follow each other without interruption so that a change in the language underlying the keypad input sequence is determined with a high reliability.

A change of the language setting for the text message entered may further advantageously comprise a request for a user confirmation for achieving a correct language setting. If at least two alternative matches are provided by one or more dictionary-based disambiguation modes for a text element entered, a decision on the correct alternative is preferably obtained by means of a request for selecting the appropriate match outputted to the user.

Preferably, the language setting used for the text message entered is fixed when a predetermined number of alternative matches selected by the user is provided by one and the same dictionary-based disambiguation model, as this indicates that the emphasis of the text message shifts to a different language.

To improve the reliability of a language setting determination, a language setting is preferably determined as the language related to a dictionary-based disambiguation mode that provides a percentage of matches, which equals or exceeds a pre-set threshold value for a text being examined with the dictionary-based disambiguation mode. If a predefined number of text elements at the beginning of a text message show a percentage of matches that is below a pre-set value with each dictionary-based disambiguation mode available on the electronic equipment for wireless communication, the language setting is advantageously determined to be a default language setting or to be an instruction for setting the keypad input mode to multitap-mode.

The language setting determined for a received message is effectively stored in relation to a phone-book entry related to the sender of the received message and used with the next message destined to said sender.

The electronic equipment for wireless communication may advantageously be formed by a mobile radio terminal, since it is the most commonly used appliance for wireless telecommunication.

BRIEF DESCRIPTION OF THE DRAWINGS

In the following, the present invention is described in detail with respect to particular embodiments and in relation to the enclosed figures, wherein.

DETAILED DESCRIPTION OF EMBODIMENT

An embodiment of an electronic equipment for wireless communication according to the present invention is shown in form of a schematic representation in FIG. 1. Only those components necessary for the understanding of the present invention are indicated in the figure. Further components which are necessary for the operation of a respective electronic equipment or components serving additional features, like e.g. an antenna, a baseband circuit, a security means, function keys or the like have been omitted for the sake of clarity but are deemed as components present in the equipment.

The term electronic equipment also includes portable radio communication equipment. The term portable radio communication equipment, which is hereinafter referred to as a mobile radio terminal, includes all equipment such as mobile telephones, pagers, and communicators like electronic organisers, smartphones or the like more.

The mobile radio terminal 1 is equipped with a transceiving means 2 for transmitting and receiving information like e.g. text messages to and from a wireless communication network. All operations of the mobile radio terminal 1 are controlled by a central processing means functioning as the central control means 7. It uses a storage means 3 for reading and writing information required or created during the operation.

The mobile radio terminal 1 further comprises a keypad 8 formed by an array of individual keys, which are usually used to enter numbers for establishing a communication line. The keypad also usually comprises further special function keys (not shown), which are typically used to browse through a menu structure for getting access to different functions of the equipment and for selecting items provided by the menu. When used in text mode, i.e. in a data input mode enabling a text entry, key assignments different to the above described are activated. A respective example for a multiple key assignment is indicated for a number of key representations in FIG. 1. Typically three or more alphabetic characters are grouped on one key with further special characters being additionally assigned to such a key.

The keypad 8 is operated by means of a keypad control unit 6, which is among other things responsible for controlling the keypad input mode in correspondence to a dictionary-based disambiguation mode related to a language setting determined by the language setting determination means 4. Visual and audible communication with a user of the mobile radio terminal 1 is managed using the audio-visual interface 5 comprising at least a display, a microphone and a loudspeaker.

The control of the mobile radio terminal 1 is for the most part implemented by software suited for being executed by the processing means 7. The software is typically stored in the storage means 3. It comprises instructions, which are adapted to have the processing means 7 perform a control mechanism in correspondence to a method according to the present invention as described below. The software can be stored in a non-volatile section of the storage means 3 when the mobile radio terminal 1 is turned off. Updates of the software, particularly those comprising routines that enable a language sensitive keypad control according to the present invention can be received wirelessly by the transceiving means 2 of the mobile radio terminal 1 or through one of the data-ports like an IrDA (Infrared Data Association) or USB universal Serial Bus) interface if available on the electronic equipment.

Figure 2:
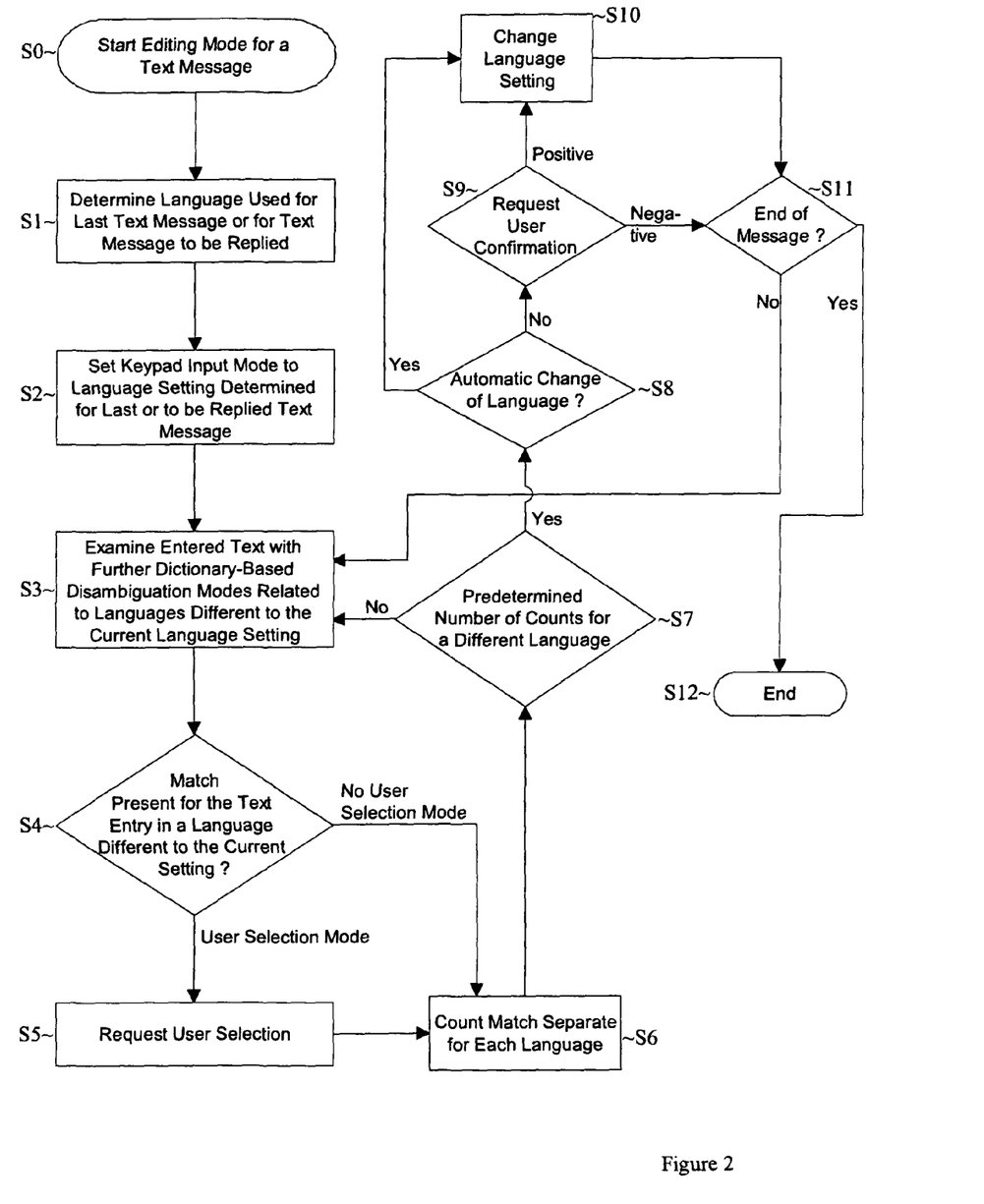
FIG. 2 is a flowchart showing the method steps according to an embodiment of the present invention.

The basic steps of a method according to the present invention are shown in the flowchart of FIG. 2. The most common situations for starting a disambiguation keypad input mode are the drafting of a text message intended to be transmitted to another communication party and the entry of personal notes. The editing mode has to be started on the mobile radio terminal 1 before text can be entered with the keypad 8. Irrespective of the type of text entered and its intended purpose, any type of text file created on the mobile radio terminal 1 is in this specification referred to as a text message in order to simplify the description of the present invention.

After starting the editing mode for a text message in step S0, the language determination means 4 determines in step S1 the language setting used for the last text message or if a received text message is to be replied, the language setting complying with the received text message.

The determination of the language setting used for the last text message entered on the mobile radio terminal 1 can be accomplished in several different ways from which the most simple reads the respective language setting from a data file providing the required information. The data file can be formed by a separate data file listing the language setting of the last or of a few of the past text messages entered on the mobile radio terminal 1. Like other files, it is stored in a memory of the storage means 3 like for instance in a built in memory or in a sort of shadow memory on a Subscriber Identity Module. In another embodiment of the present invention, the language setting information is contained within the data file containing the respective last text message. If the language setting information is already contained within a text message to be replied with the currently edited text message, the determination of the language setting is accomplished by reading the respective language information from this received text message. Independent on how the language setting of a received message will be obtained, the respective information is preferably stored in a data file containing at least a phone-book entry related to the sender of the received message. When drafting a reply or another kind of text message to that sender, the language setting is read from that data file, which provides this language information preferably in direct connection with the phone-book entry.

In an alternative embodiment, the language setting is determined by analysing the text contained in the text message taken as the basis for specifying a current language setting. The respective text message is either formed by the text message entered before, i.e. the last text message entered on the mobile radio terminal 1 or by a received text message to be replied by the text message currently entered.

The text analysis itself is typically performed by splitting up the message in individual text elements corresponding to words, numbers or abbreviations, which are then one after another examined with various dictionary-based disambiguation modes present on the mobile terminal 1. Each of the dictionary-based disambiguation modes is related to a different language and results a number of matches for the examined text, whereby each match may be furnished with a probability for its identification. The matches are then added for each dictionary-based disambiguation mode separately and are possibly also weighted with the determined probabilities. The language setting assigned to the dictionary-based disambiguation mode resulting the most and/or most likely matches is taken as the one to be determined.

Instead of adding the matches or weighted matches as such, the percentage of the direct or weighted matches in an analysed text is monitored according to an alternative embodiment for determining the language setting of a text message. A corresponding analysis of a message may be confined to a predefined number of text elements at the beginning of the message only, but may also be extended to the complete text of the message. The language related to the dictionary based disambiguation mode resulting in the highest percentage of matches is then taken as the language setting to be determined. This type of a language determination is preferably used when examining a received text message to be replied.

To enhance the quality of a language setting, the determination of the language setting requires that the percentage of matches obtained with a dictionary disambiguation mode equals or exceeds a pre-set threshold value. If the percentage of matches obtained with each dictionary-based disambiguation mode available on the electronic equipment for wireless communication 1 is below a pre-set threshold value for a predefined number of text elements at the beginning of a text message, the language setting will either be determined as a default language setting or as an instruction for setting the keypad input mode to multitap-mode.

When the determination of the language setting used in the text message taken as the basis is completed, the method continues with step S2, where the keypad input mode is set to employ a dictionary-based disambiguation mode related to the language setting determined in step S1. The thus set keypad disambiguation mode interprets the ambiguous key input sequences in correspondence with the underlying disambiguation model and transforms the key input in text of a language according to the determined language setting.

In a further preferred embodiment of the present invention the keypad input sequences are in addition examined in step S3 for alternative matches by different dictionary-based disambiguation modes that are available on the mobile radio terminal 1. This means that the dictionary-based disambiguation modes related to other languages than that of the current language setting monitor the keypad mediated text entries for alternative matches. If an alternative match is found in step S4 this match may be used in two different ways.

In a first one, a user selection mode activated on the mobile radio terminal 1 allows a user in step S5 to accept a text element corresponding to an alternative match in a language different to the predominant language of the text message. In another embodiment of the present invention, the user may further be enabled to not only select the individual match, but also to change the current keypad disambiguation mode to the dictionary-based disambiguation mode providing the selected match.

If no respective user selection mode is active on the mobile radio terminal, the alternatively determined matches are counted separately for each dictionary-based disambiguation mode in step S6, which may also succeed step S5 described above. If it is found in step S7 that the predetermined number of counts is not obtained for a certain dictionary-based disambiguation mode, the method returns to step S3. Else, a change of the current language setting to a language setting according to the dictionary-based disambiguation mode furnishing the predetermined number of counts is made subject to a query in step S8. The predetermined number of counts may be set to any natural number greater than zero.

The query according to step S8 checks if the keypad input mode is to be changed automatically or requires a user confirmation. If the keypad input mode change requests a user confirmation, this confirmation is requested in step S9 by e.g. placing a respective information on the display of the mobile radio terminal 1. If the response of the user to the request is positive, the language setting is changed in step S10 with the keypad disambiguation mode changed accordingly. If the user response is negative, the method proceeds directly to step S11, where it is checked if the entry of text for the text message has been terminated. Step S11 also follows step S10. Upon the entry of text for the text message detected to be terminated, the method ends in step S12. If the entry of text continues, the method proceeds with step S3.

In summary, the keypad input mode set on starting the text editing mode is monitored in the described way and changed on condition of the key input sequence entered yielding a better match with a different keypad input mode. After the change of the keypad input mode, the new mode is preferably fixed. But alternatively, the monitoring of the key input sequences may be continued to enable text messages having text elements originating from a language different to the language prevailing in the text message.

To improve the reliability of a detection of a language change in a text when entered, the count number is reset to zero upon no match found with the disambiguation mode having provided a match for the preceding text element. Thus, the predetermined number of counts is only achieved for consecutively entered text elements having matches in one and the same disambiguation mode.

The present invention enables a very flexible handling of the keypad input mode allowing a user to draft text messages in different languages with a minimum of user interaction. Particularly when waiving the user confirmation according to step S9, a user interaction is reduced to only those cases, where multiple equivalent matches are found in different language disambiguation modes.

The invention claimed is:

1. Method of controlling a keypad input mode for a text message entered on an electronic equipment for wireless communication, the method comprising steps for:
   determining a language setting for the text message, and
   setting the keypad input mode to a dictionary-based disambiguation mode relating to the determined language setting,
      whereby the language setting used at the beginning of the text message corresponds to the language setting used for the last text message entered on the electronic equipment for wireless communication or corresponds to the language determined for a received text message to be replied by the text message, and the language setting is subject to be changed if a match for a predetermined number of text elements entered for the text message is present in a further dictionary-based disambiguation mode related to a different language setting,
      wherein the language setting used for the text message entered last on the electronic equipment for wireless communication is provided in a data file.

2. Method according claim 1, wherein the language of the received text message to be replied is determined by examining the text elements of the received text message with each of the dictionary-based disambiguation modes available on the electronic equipment for wireless communication and by defining the language of the received text message as the language of the dictionary-based disambiguation mode yielding the highest percentage of matches with a predefined number of text elements at the beginning of the received text message or with all text elements of the message.

3. Method according to claim 1, wherein the text elements of said predetermined number of entered text elements follow each other without interruption.

4. Method according to claim 1,
   wherein a change of the language setting for the text message entered comprises a request for a user confirmation.

5. Method according to claim 1, wherein a language setting is determined as the language related to a dictionary-based disambiguation mode, which provides a percentage of matches that equals or exceeds a pre-set threshold value for a text being examined with the dictionary-based disambiguation mode.

6. Electronic equipment for wireless communication according to claim 1 wherein the electronic equipment for wireless communication is formed by a mobile radio terminal.

7. Method of controlling a keypad input mode for a text message entered on an electronic equipment for wireless communication, the method comprising steps for:
   determining a language setting for the text message, and
   setting the keypad input mode to a dictionary-based disambiguation mode relating to the determined language setting,
      whereby the language setting used at the beginning of the text message corresponds to the language setting used for the last text message entered on the electronic equipment for wireless communication or corresponds to the language determined for a received text message to be replied by the text message, and the language setting is subject to be changed if a match for a predetermined number of text elements entered for the text message is present in a further dictionary-based disambiguation mode related to a different language setting, wherein if at least two alternative matches for a text element entered are provided by one or more dictionary-based disambiguation modes, a request for selecting the appropriate match is outputted to the user.

8. Method according to claim 7, wherein the language setting used for the text message entered is fixed upon a predetermined number of alternative matches selected by the user being provided by a dictionary-based disambiguation model for the same language.

9. Method of controlling a keypad input mode for a text message entered on an electronic equipment for wireless communication, the method comprising steps for:
determining a language setting for the text message, and
setting the keypad input mode to a dictionary-based disambiguation mode relating to the determined language setting,
whereby the language setting used at the beginning of the text message corresponds to the language setting used for the last text message entered on the electronic equipment for wireless communication or corresponds to the language determined for a received text message to be replied by the text message, and the language setting is subject to be changed if a match for a predetermined number of text elements entered for the text message is present in a further dictionary-based disambiguation mode related to a different language setting,
wherein if for a predefined number of text elements at the beginning of a text message, the percentage of matches obtained with each dictionary-based disambiguation mode available on the electronic equipment for wireless communication is below a pre-set threshold value, the language setting is determined to be a default language setting or to be an instruction for setting the keypad input mode to multitap-mode.

10. Method of controlling a keypad input mode for a text message entered on an electronic equipment for wireless communication, the method comprising steps for:
determining a language setting for the text message, and
setting the keypad input mode to a dictionary-based disambiguation mode relating to the determined language setting,
whereby the language setting used at the beginning of the text message corresponds to the language setting used for the last text message entered on the electronic equipment for wireless communication or corresponds to the language determined for a received text message to be replied by the text message, and the language setting is subject to be changed if a match for a predetermined number of text elements entered for the text message is present in a further dictionary-based disambiguation mode related to a different language setting,
wherein the language setting determined for a received message is stored in relation to a phone-book entry related to the sender of the received message and used with as the language setting for a subsequent message destined to said sender.

11. Electronic equipment for wireless communication with a language-sensitive keypad input mode control for a text message entry, the electronic equipment for wireless communication comprising:
a keypad having at least one key to which more than one character is assigned for alphabetic input,
a language setting determination means for determining a language setting,
a keypad mode control means adapted for controlling the keypad input mode in correspondence to a dictionary-based disambiguation mode relating to a language setting determined by the language setting determination means, whereby the language setting determination means is adapted to determine the language setting used at the beginning of the text message corresponding to the language setting used for the last text message entered on the electronic equipment for wireless communication or corresponding to the language determined for a received text message to be replied by the text message, and the language setting determination means is further adapted to change the language setting if a match for a predetermined number of text elements entered for the text message is present in a further dictionary-based disambiguation mode relating to a different language setting, and
comprising a storage means which is adapted to store a file comprising information concerning the language setting used for the last text message entered on the electronic equipment for wireless communication.

12. Electronic equipment for wireless communication according to claim 11, wherein the language setting determination means is adapted to determine the language of the received text message to be replied by examining the text elements of the received text message with each of the dictionary-based disambiguation modes available on the electronic equipment for wireless communication and by defining the language of the received text message as the language of the dictionary-based disambiguation mode yielding the highest percentage of matches with a predefined number of text elements at the beginning of the received text message or with all text elements of the message.

13. Electronic equipment for wireless communication according to claim 11, wherein the language setting determination means is adapted to change the language setting only for the text elements of said predetermined number of entered text elements following each other without interruption.

14. Electronic equipment for wireless communication according to claim 11, wherein the language setting determination means is adapted to request a user confirmation before changing the language setting and to change the language setting in response to the user confirmation.

15. Electronic equipment for wireless communication according to claim 11, wherein the language setting determination means is adapted to determine a language setting as the language related to a dictionary-based disambiguation mode that provides a percentage of matches, which equals or exceeds a pre-set threshold value for a text being examined with the dictionary-based disambiguation mode.

16. Electronic equipment for wireless communication with a language-sensitive keypad input mode control for a text message entry, the electronic equipment for wireless communication comprising:
a keypad having at least one key to which more than one character is assigned for alphabetic input,
a language setting determination means for determining a language setting, a keypad mode control means adapted for controlling the keypad input mode in correspondence to a dictionary-based disambiguation mode relating to a language setting determined by the language setting determination means, whereby the language setting determination means is adapted to determine the language setting used at the beginning of the text message corresponding to the language setting used for the last text message entered on the electronic equipment for wireless communication or corresponding to the language determined for a received text message to be replied by the text message, and the language setting determination means is further adapted to change the language setting if a match for a predetermined number of text elements entered for the text message is present in a further dictionary-based disambiguation mode relating to a different language setting, and wherein the language setting determination means is adapted to request a user selection for selecting an appropriate match out of at least two alternative matches provided by one or more dictionary-based disambiguation modes for a text element entered.

17. Electronic equipment for wireless communication according to claim 16, wherein the language setting determination means is further adapted to fix the language setting used for the text message upon a predetermined number of alternative matches selected by the user being provided by a dictionary-based disambiguation model for the same language.

18. Electronic equipment for wireless communication with a language-sensitive keypad input mode control for a text message entry, the electronic equipment for wireless communication comprising:

a keypad having at least one key to which more than one character is assigned for alphabetic input, a language setting determination means for determining a language setting, a keypad mode control means adapted for controlling the keypad input mode in correspondence to a dictionary-based disambiguation mode relating to a language setting determined by the language setting determination means, whereby the language setting determination means is adapted to determine the language setting used at the beginning of the text message corresponding to the language setting used for the last text message entered on the electronic equipment for wireless communication or corresponding to the language determined for a received text message to be replied by the text message, and the language setting determination means is further adapted to change the language setting if a match for a predetermined number of text elements entered for the text message is present in a further dictionary-based disambiguation mode relating to a different language setting, and wherein the language setting determination means is adapted to determine the language setting to be a default language setting or to be an instruction for setting the keypad input mode to multitap- mode if a predefined number of text elements at the beginning of a text message show a percentage of matches that is below a pre-set value with each dictionary-based disambiguation mode available on the electronic equipment for wireless communication.

19. Electronic equipment for wireless communication with a language-sensitive keypad input mode control for a text message entry, the electronic equipment for wireless communication comprising:

a keypad having at least one key to which more than one character is assigned for alphabetic input, a language setting determination means for determining a language setting, a keypad mode control means adapted for controlling the keypad input mode in correspondence to a dictionary-based disambiguation mode relating to a language setting determined by the language setting determination means, whereby the language setting determination means is adapted to determine the language setting used at the beginning of the text message corresponding to the language setting used for the last text message entered on the electronic equipment for wireless communication or corresponding to the language determined for a received text message to be replied by the text message, and the language setting determination means is further adapted to change the language setting if a match for a predetermined number of text elements entered for the text message is present in a further dictionary-based disambiguation mode relating to a different language setting, and wherein the electronic equipment for wireless communication is adapted to store a language setting determined for a received message in relation to a phone-book entry related to the sender of the received message and is further adapted to set said language setting at the beginning of a following text message destined to said sender.

20. A non-transitory computer readable storage medium with a computer software product for controlling a keypad input mode for a text message entered on an electronic equipment for wireless communication, wherein the electronic equipment has a language-sensitive keypad input mode control for a text message entry, the electronic equipment for wireless communication comprising:

a keypad having at least one key to which more than one character is assigned for alphabetic input, a language setting determination means for determining a language setting, a keypad mode control means adapted for controlling the keypad input mode in correspondence to a dictionary-based disambiguation mode relating to a language setting determined by the language setting determination means, whereby the language setting determination means is adapted to determine the language setting used at the beginning of the text message corresponding to the language setting used for the last text message entered on the electronic equipment for wireless communication or corresponding to the language determined for a received text message to be replied by the text message, and the language setting determination means is further adapted to change the language setting if a match for a predetermined number of text elements entered for the text message is present in a further dictionary-based disambiguation mode relating to a different language setting, the computer software product being configured, when loaded into a memory and processed by a data processing means of the electronic equipment for wireless communication to perform thereon a method according to claim 1.

21. A non-transitory computer readable storage medium with a computer software product for controlling a keypad input mode for a text message entered on an electronic equipment for wireless communication, wherein the electronic equipment has a language-sensitive keypad input mode control for a text message entry, the electronic equipment for wireless communication comprising:

a keypad having at least one key to which more than one character is assigned for alphabetic input, a language setting determination means for determining a language setting, a keypad mode control means adapted for controlling the keypad input mode in correspondence to a dictionary-based disambiguation mode relating to a language setting determined by the language setting determination means, whereby the language setting determination means is adapted to determine the language setting used at the beginning of the text message corresponding to the language setting used for the last text message entered on the electronic equipment for wireless communication or corresponding to the language determined for a received text message to be replied by the text message, and the language setting determination means is further adapted to change the language setting if a match for a predetermined number of text elements entered for the text message is present in a further dictionary-based disambiguation mode relating to a different language setting, the computer software product being configured, when loaded into a memory and processed by a data processing means of the electronic equipment for wireless communication to perform thereon a method according to claim 7.

22. A non-transitory computer readable storage medium with a computer software product for controlling a keypad input mode for a text message entered on an electronic equipment for wireless communication, wherein the electronic equipment has a language-sensitive keypad input mode control for a text message entry, the electronic equipment for wireless communication comprising:

a keypad having at least one key to which more than one character is assigned for alphabetic input, a language setting determination means for determining a language setting, a keypad mode control means adapted for controlling the keypad input mode in correspondence to a dictionary-based disambiguation mode relating to a language setting determined by the language setting determination means, whereby the language setting determination means is adapted to determine the language setting used at the beginning of the text message corresponding to the language setting used for the last text message entered on the electronic equipment for wireless communication or corresponding to the language determined for a received text message to be replied by the text message, and the language setting determination means is further adapted to change the language setting if a match for a predetermined number of text elements entered for the text message is present in a further dictionary-based disambiguation mode relating to a different language setting, the computer software product being configured, when loaded into a memory and processed by a data processing means of the electronic equipment for wireless communication to perform thereon a method according to claim 9.

23. A non-transitory computer readable storage medium with a computer software product for controlling a keypad input mode for a text message entered on an electronic equipment for wireless communication, wherein the electronic equipment has a language-sensitive keypad input mode control for a text message entry, the electronic equipment for wireless communication comprising:

a keypad having at least one key to which more than one character is assigned for alphabetic input, a language setting determination means for determining a language setting, a keypad mode control means adapted for controlling the keypad input mode in correspondence to a dictionary-based disambiguation mode relating to a language setting determined by the language setting determination means, whereby the language setting determination means is adapted to determine the language setting used at the beginning of the text message corresponding to the language setting used for the last text message entered on the electronic equipment for wireless communication or corresponding to the language determined for a received text message to be replied by the text message, and the language setting determination means is further adapted to change the language setting if a match for a predetermined number of text elements entered for the text message is present in a further dictionary-based disambiguation mode relating to a different language setting, the computer software product being configured, when loaded into a memory and processed by a data processing means of the electronic equipment for wireless communication to perform thereon a method according to claim 10.

* * * * *

UNITED STATES PATENT AND TRADEMARK OFFICE
CERTIFICATE OF CORRECTION

PATENT NO. : 8,364,134 B2
APPLICATION NO. : 11/915624
DATED : January 29, 2013
INVENTOR(S) : Rang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1296 days.

Signed and Sealed this

First Day of September, 2015

Michelle K. Lee
*Director of the United States Patent and Trademark Office*